US005608723A

United States Patent [19]

Felsenstein

[11] Patent Number: 5,608,723

[45] Date of Patent: Mar. 4, 1997

[54] METHODS AND SYSTEMS FOR SECURE WIRELESS COMMUNICATION WITHIN A PREDETERMINED BOUNDARY

[75] Inventor: Lee Felsenstein, Palo Alto, Calif.

[73] Assignee: Interval Research Corporation, Palo Alto, Calif.

[21] Appl. No.: 429,031

[22] Filed: Apr. 26, 1995

[51] Int. Cl.$^{6}$ .......... H04J 13/00

[52] U.S. Cl. .......... 370/335; 370/468; 455/33.1; 455/38.1; 359/136

[58] Field of Search .......... 370/18, 95.1, 59.3, 370/84; 375/202, 205; 455/33.1, 38.1, 53.1, 54.1, 59; 340/825.04, 825.44; 380/21, 33, 34, 42, 43

[56] References Cited

U.S. PATENT DOCUMENTS

| | | | |
|---|---|---|---|
| 4,484,027 | 11/1984 | Lee et al. | 380/21 |
| 5,208,859 | 5/1993 | Bartucci et al. | 380/21 |
| 5,371,794 | 12/1994 | Diffie et al. | 380/21 |
| 5,398,285 | 3/1995 | Borgelt et al. | 380/21 |
| 5,471,532 | 11/1995 | Gardeck et al. | 380/21 |

*Primary Examiner*—Benedict V. Safourek
*Assistant Examiner*—Ricky Ngo
*Attorney, Agent, or Firm*—Brooks & Kushman

[57] ABSTRACT

A message signal which is to be securely communicated is encoded, using a preselected code, to generate an encoded signal. A radio frequency signal representative of the encoded signal is transmitted, wherein the radio frequency signal may propagate beyond the predetermined boundary. A code signal representative of the preselected code is also transmitted, wherein propagation of the code signal is confined within the predetermined boundary. At a corresponding receiver within the predetermined boundary, the code signal and the radio frequency signal are received. The encoded signal represented by the radio frequency signal is decoded based upon the preselected code in order to recover the message signal.

39 Claims, 2 Drawing Sheets

METHODS AND SYSTEMS FOR SECURE WIRELESS COMMUNICATION WITHIN A PREDETERMINED BOUNDARY

TECHNICAL FIELD

The present invention relates to methods and systems for providing a secure wireless communication link between a transmitter and a receiver.

BACKGROUND OF THE INVENTION

Cellular radio communication is an established technology wherein an area of communication coverage is divided into a plurality of cells. Each of the cells includes a base station equipped with a transceiver which communicates with mobile transceivers contained within the cell. The base station communicates with the mobile transceivers using radio frequency signals. Typically, the base station is linked to a communication network, such as a public telephone network, to provide an overall communication link between each mobile transceiver and the communication network.

Each cell has a boundary defined by an area of domination of a particular base station transmitter contained therein. The cells can range in size from a radius of one mile or less to 25 miles or more, with the size being determined by the transmitted signal power and the height of the antenna used by the base station. Although each cell is substantially dominated by a single base station, radio frequency signals from adjacent cells also propagate within each cell.

Problems of interference resulting from adjacent cell propagation arise when utilizing a cellular-type service within a building. The building may be divided into a plurality of microcells, wherein each microcell corresponds to a room or a floor of the building. The boundary of each microcell may defined by walls, a floor, and/or a ceiling of its corresponding room. Signals transmitted within one microcell may intrude into another microcell, which may be an adjacent floor or an adjacent room in the building. The escaped signals may then be received by unintended or unauthorized listeners. The lack of security which results is of particular importance in business communications conducted in proximity to competitors and potential eavesdroppers.

SUMMARY OF THE INVENTION

It is an object of the present invention to provide a method and a system for wireless communication which is secure within a predetermined boundary.

It is a further object to provide a method and a system for establishing a secure wireless microcell within a predetermined boundary.

In carrying out the above objects, the present invention provides a method of secure wireless communication within a predetermined boundary. The method includes a step of encoding a message signal using a preselected code to generate an encoded signal. The method further includes a step of transmitting a radio frequency signal representative of the encoded signal. Finally, a step of transmitting a code signal representative of the preselected code is performed, wherein propagation of the code signal is confined within the predetermined boundary.

Further in carrying out the above objects, the present invention provides a method of receiving a secure, wireless communication of a message signal. The method includes a step of receiving a code signal representative of a preselected code. The method further includes a step of receiving a radio frequency signal representative of an encoded signal. Finally, a step of decoding the encoded signal based upon the preselected code to recover the message signal is performed.

Still further in carrying out the above objects, systems are provided which perform the steps of the above-mentioned methods.

These and other features, aspects, and advantages of the present invention will become better understood with regard to the following description, appended claims, and accompanying drawings.

BEST MODES FOR CARRYING OUT THE INVENTION

Figure 1:
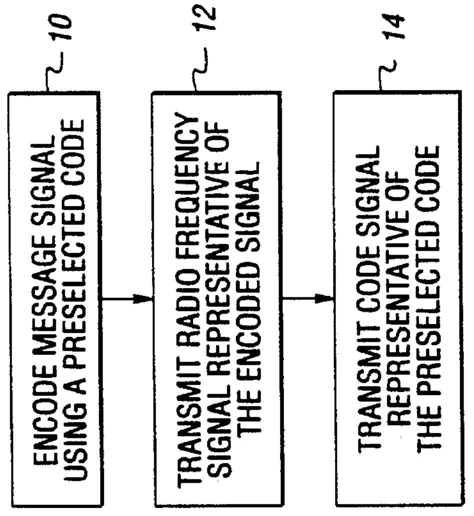
FIG. 1 is a flow diagram of an embodiment of a method of secure wireless communication within a predetermined boundary.

Referring to FIG. 1, there is shown a flow diagram of an embodiment of a method of secure wireless communication within a predetermined boundary. The predetermined boundary may be defined, for example, by walls, a ceiling, and a floor of a room. The method includes a step of encoding a message signal using a preselected code, as indicated by block 10. The message signal is a signal representative of a message which is to be communicated. Examples of typical messages which may be communicated include audio messages such as a spoken message, and data messages. The message signal may be in either an analog signal form or a digital signal form.

Preferably, the message signal is encoded using a code-division multiple access (CDMA) encoding scheme. In code-division multiple access, the preselected code has the form of a periodic binary sequence. Typically, the periodic binary sequence is based upon a pseudo-random digital key which is periodically repeated. By repeating the pseudo-random key, the periodic binary sequence provides a deterministic waveform which resembles a stochastic or random waveform.

Various types of code-division multiple access encoding schemes may be employed. Using a direct-sequence CDMA scheme, as is known in the art, the periodic binary sequence is used to modulate the message signal to generate an encoded signal. If the message signal is a digital signal having a plurality of data bits, the data bits are employed to modulate the polarity of the periodic binary sequence. Typically, the bit period of the binary sequence is selected to be less than the bit period of the message signal. Another type of CDMA encoding scheme known in the art is frequency-hopped CDMA. In frequency-hopped CDMA schemes, a radio frequency carrier is frequency modulated by the periodic binary sequence before being modulated by the message signal.

Regardless of the specific encoding scheme utilized, the step of encoding results in the generation of an encoded signal. The encoded signal may be in the form of either a baseband signal or a radio frequency signal depending upon the encoding scheme.

A step of transmitting a radio frequency signal representative of the encoded signal is performed next, as indicated by block 12. If the encoded signal is in the form of a baseband signal, the step of transmitting may further include a step of modulating a radio frequency carrier in dependence upon the encoded signal to form the radio frequency signal. If the encoded signal is in the form of a radio frequency signal, the encoded signal may be transmitted without performing a further step of modulation.

The radio frequency signal provides an encrypted representation of the message signal which is to be communicated in a wireless manner. Since the radio frequency signal is encrypted, security of the message is maintained in the event of propagation beyond the predetermined boundary, as long as the preselected code is unknown to unauthorized or unintended listeners. If a pseudo-random digital key is used in conjunction with a CDMA scheme, the radio frequency signal appears as noise to unauthorized or unintended listeners.

As indicated by block 14, the method further includes a step of transmitting a code signal representative of the preselected code. The form of the code signal is selected so that propagation thereof is confined within the predetermined boundary. Preferably, the code signal is in the form of a light signal, such as an infrared light signal or an ultraviolet light signal. Infrared light does not penetrate solid objects, such as walls, floors, and ceilings. Moreover, infrared light does not penetrate standard window glass. As a result, the preselected code is obscured from unauthorized listeners. Alternatively, the code signal may be in the form of an ultrasonic signal.

If the preselected code includes a periodic binary sequence, the code signal may be representative of a single period of the sequence. The single period of the sequence may be subsequently retransmitted; however, it is not necessary for the retransmission period to correspond to the period of the sequence. Preferably, the code signal is transmitted at a bit rate less than that of the encoded signal. More preferably, the code signal is transmitted at a bit rate less than that of the message signal.

Figure 2:
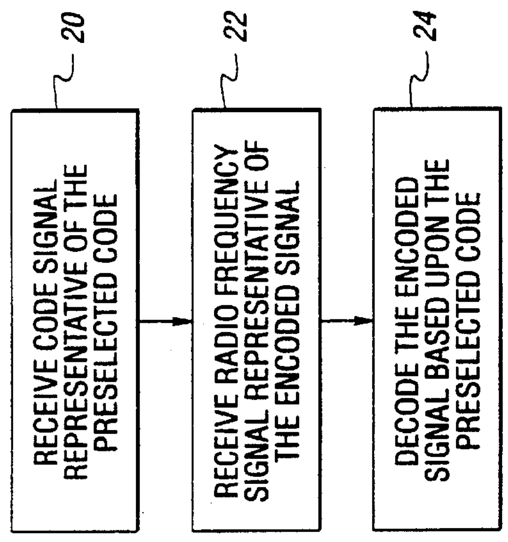
FIG. 2 is a flow diagram of an embodiment of a method of receiving a secure, wireless communication of a message signal.

Turning now to FIG. 2, there is shown a flow diagram of an embodiment of a method of receiving a secure, wireless communication of a message signal. The method includes a step of receiving a code signal representative of the preselected code, as indicated by block 20. As mentioned in the foregoing description, the code signal is preferably a light signal, such as an infrared light signal or an ultraviolet light signal, whose propagation is confined within the predetermined boundary. Alternatively, the code signal may be an ultrasonic signal. Also in a preferred embodiment, the code signal is representative of at least one period of a periodic binary sequence which forms a pseudo-random digital key.

The method further includes a step of receiving the radio frequency signal representative of the encoded signal, as indicated by block 22. Preferably, the radio frequency signal is representative of a CDMA-encoded version of the message signal formed using the predetermined code.

A step of decoding the encoded signal based upon the preselected code is performed as indicated by block 24. Various approaches may be utilized to decode the encoded signal. If the code signal provides the periodic binary sequence in synchronization with its use in a step of encoding the message signal, then the code signal may be directly utilized in performing a step of coherently decoding the encoded signal, in accordance with a CDMA scheme, to recover the message signal.

If the code signal provides a single period of the binary sequence, the step of decoding may include steps of storing the single period of the binary sequence, and regenerating the periodic binary sequence in time-synchronization with the sequence utilized in the step of encoding. Then, the encoded signal may be coherently decoded in accordance with a CDMA scheme using the regenerated periodic binary sequence to recover the message signal.

Figure 3:
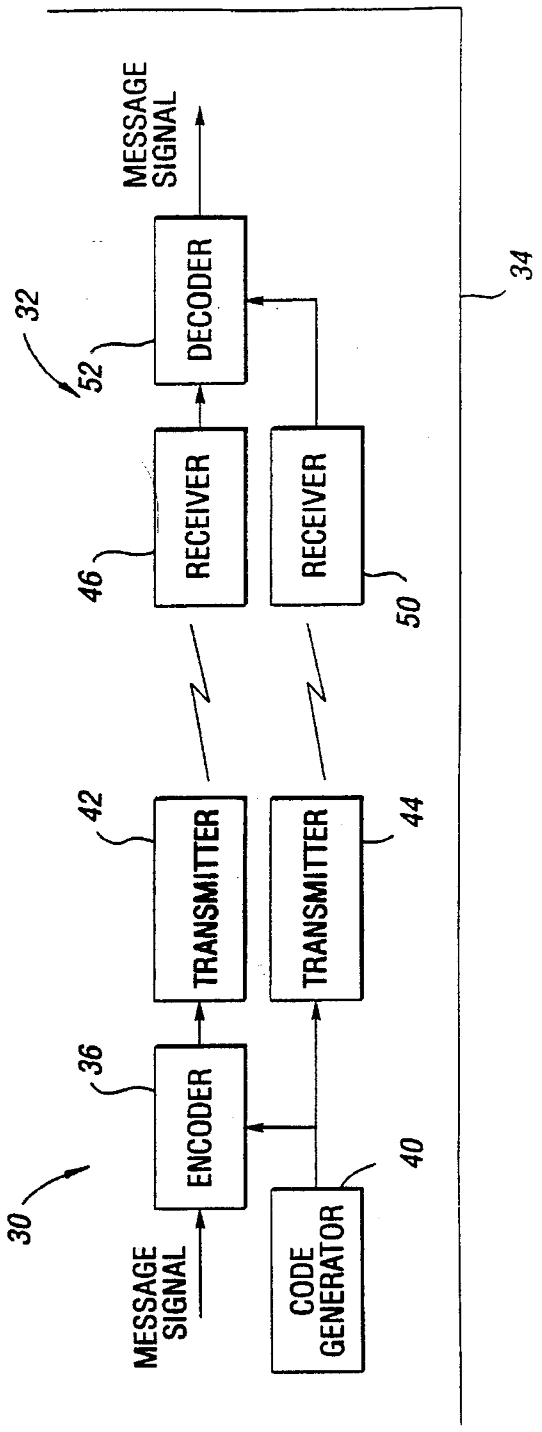
FIG. 3 is a block diagram of an embodiment of a system for secure wireless communication within a predetermined boundary.

Referring now to FIG. 3, there is shown a block diagram of an embodiment of a system for providing a secure wireless communication link between a transmitter unit generally indicated by reference numeral 30, and a receiver unit generally indicated by reference numeral 32. The transmitter unit 30 provides a system for secure wireless communication of a message signal within a predetermined boundary 34. The receiver unit 32 provides a system for receiving the secure, wireless communication of the message signal.

The transmitter unit 30 includes an encoder 36 to which the message signal is applied. As described earlier, the message signal may be either an analog signal or a digital signal representative of a message to be communicated. The encoder 36 encodes the message signal using a preselected code generated by a code generator 40, and generates an encoded signal. Preferably, the code generator 40 generates a periodic binary sequence using a pseudo-random digital key.

In preferred embodiments, the encoder 36 encodes the message signal using a code-division multiple access encoder (not specifically illustrated). The code-division multiple access encoder may utilize a direct-sequence CDMA scheme, a frequency-hopped CDMA scheme, or other CDMA schemes.

The transmitter unit 30 further includes a transmitter 42 operatively associated with the encoder 36. The transmitter 42 transmits a radio frequency signal representative of the encoded signal. If the encoded signal is a baseband signal, the transmitter 42 may include a radio frequency modulator (not specifically illustrated) to modulate a radio frequency carrier in dependence upon the encoded signal to form the radio frequency signal. If the encoded signal is already in a radio frequency form, the transmitter need not include a modulator.

Also included in the transmitter unit 30 is a transmitter 44 operatively associated with the code generator 40. The transmitter 44 transmits a code signal representative of the preselected code. The form of the code signal is selected so that its propagation is confined within the predetermined boundary 34. Preferably, the code signal is in the form of a light signal and the transmitter 44 includes a light-emitting element (not specifically illustrated) to transmit the code signal. For example, the transmitter 44 may include an infrared light emitter for transmitting an infrared-light code signal, or an ultraviolet light emitter for transmitting an ultraviolet-light code signal. Alternatively, the code signal may be an acoustic signal such as an ultrasonic signal.

The code signal may be representative of the repeating, periodic binary sequence provided to the encoder 36 by the code generator 40. Here, it is preferred that the code signal transmitted by the transmitter 44 be in synchronization with the encrypted signal transmitted by the transmitter 42.

Alternatively, the code signal may be representative of a single period of a periodic binary sequence. Here, the code signal may be subsequently retransmitted at a time interval different from the period of the binary sequence.

The receiver unit 32 includes a receiver 46 which receives the radio frequency signal representative of the encoded signal. The receiver unit 32 further includes a receiver 50 which receives the code signal representative of the preselected code. If the code signal is in the form of a light signal, the receiver 50 typically includes a light-detecting element (not specifically illustrated) such as an infrared detector or an ultraviolet detector. Alternatively, the receiver 50 may include an audio sensing device if the code signal is in the form of an acoustic pressure wave.

The receiver unit 32 further includes a decoder 52 operatively associated with the receivers 46 and 50. The decoder 52 decodes the encoded signal provided by the receiver 46 based upon the preselected code provided by the receiver 50. If a CDMA encoder is employed in the transmitter unit 30, then the decoder 52 includes a CDMA decoder (not specifically illustrated). The CDMA decoder may decode the encode signal in accordance with a direct-sequence CDMA scheme, a frequency-hopped CDMA scheme, or other CDMA schemes.

If the code signal provides the periodic binary sequence in synchronization with its use in the encoder 36, then the code signal may be directly utilized in the decoder 52 to coherently decode the encoded signal to recover the message signal. If the code signal provides a single period of the binary sequence, the decoder 52 may include a storage device for storing the single period of the binary sequence, and a code generator which regenerates the periodic binary sequence in time-synchronization with the sequence generated by the code generator 40. Then, the encoded signal may be coherently decoded in accordance with a CDMA scheme using the regenerated periodic binary sequence to recover the message signal.

It is noted that for two-way communication, a transceiver unit containing both a transmitter unit and a receiver unit in accordance with the present invention may be utilized.

Figure 4:
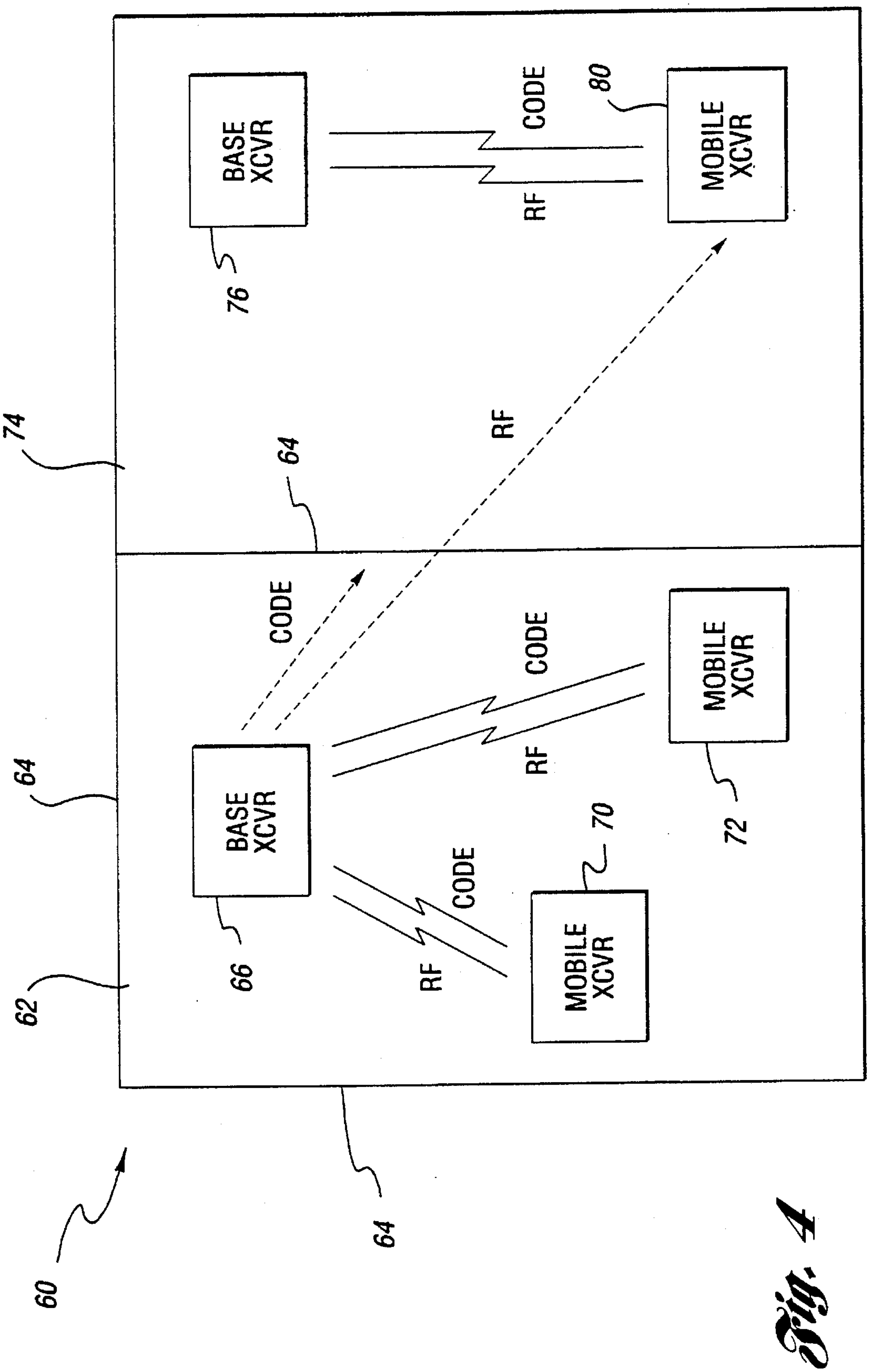
FIG. 4 is a schematic, block diagram of an embodiment of a wireless microcell configuration in accordance with embodiments of the present invention.

Referring now to FIG. 4, there is illustrated a schematic, block diagram of an embodiment of a wireless microcell configuration in accordance with embodiments of the present invention. A building 60 includes a room 62 defined by walls 64, a ceiling (not specifically illustrated), and a floor (not specifically illustrated). The room 62 includes a base transceiver unit 66 as described herein which communicates with mobile transceiver units 70 and 72 located within the room 62. The building 60 has a room 74 adjacent to the room 62. The room 74 has its own base transceiver unit 76 which communicates with a mobile transceiver unit 80.

The base transceiver units 66 and 76 utilize different preselected codes so that radio frequency signals which penetrate the walls 64 appear as noise to an unintended mobile transceiver units. For example, the radio frequency signals generated by the base transceiver unit 66 appear as noise to the mobile transceiver unit 80. As a result, radio communications are secure within specified rooms of the building. Further, within the same room, the mobile transceivers can be made to respond only to certain codes to limit access to particular wireless channels. Consequently, embodiments of the present invention may be utilized to create a security hierarchy wherein infrared "spotlights" may be employed to create limited areas within which higher security channels may be utilized along with lower level channels.

Moreover, a mobile receiver unit may be configured to perform an action in response to the preselected code received from the base station. For example, the receiver unit may transmit an alert message if a code "spotlight" directed thereon is not detected. By incorporating the receiver unit into a piece of equipment, and directing a code spotlight onto the equipment, a security perimeter for the equipment may be established.

The above-described embodiments of the present invention have many advantages. By utilizing encrypted radio frequency communications with a confined transmission of a preselected code, the radio frequency signal may be transmitted at a sufficient signal strength within the cell without concern for the security of signals leaking out of the cell.

Embodiments of the present invention are not limited to ultra-high radio frequencies or to cellular networks. Embodiments of the present invention may be applied to standard portable telephones in order to enclose the area of communication within one room or a suite of rooms. Further, embodiments of the present invention may be utilized as a foundation of a transponder system for use with active employee badges or equipment identification tags.

It should be noted that the present invention may be used in a wide variety of different constructions encompassing many alternatives, modifications, and variations which are apparent to those with ordinary skill in the art. Accordingly, the present invention is intended to embrace all such alternatives, modifications, and variations as fall within the spirit and broad scope of the appended claims.

What is claimed is:

1. A method of secure wireless communication of a message signal within a predetermined boundary, the method comprising the steps of:

encoding the message signal using a preselected code to generate an encoded signal;

transmitting a radio frequency signal representative of the encoded signal; and transmitting a code signal representative of the preselected code, wherein propagation of the code signal is confined within the predetermined boundary.

2. The method of claim 1 wherein the message signal is encoded using a code-division multiple access scheme.

3. The method of claim 1 wherein the preselected code includes a binary sequence.

4. The method of claim 3 wherein the binary sequence is periodic based upon a pseudo-random digital key.

5. The method of claim 3 wherein the code signal is transmitted at a bit rate less than a bit rate of the encoded signal.

6. The method of claim 3 wherein the code signal is transmitted at a bit rate less than a bit rate of the message signal.

7. The method of claim 1 wherein the predetermined boundary is defined by at least one wall, a floor, and a ceiling.

8. The method of claim 1 wherein the radio frequency signal propagates beyond the predetermined boundary.

9. The method of claim 1 wherein the code signal is a light signal.

10. The method of claim 9 wherein the code signal is an infrared light signal.

11. The method of claim 9 wherein the code signal is an ultraviolet light signal.

12. The method of claim 1 wherein the code signal is an ultrasonic signal.

13. A method of secure wireless communication of a message signal within a predetermined boundary defined by at least one wall, a floor, and a ceiling, the method comprising the steps of:

encoding the message signal using a preselected pseudo-random digital key to generate an encoded signal, the message signal encoded by a code-division multiple access scheme;

transmitting a radio frequency signal representative of the encoded signal, the radio frequency signal propagating beyond the predetermined boundary; and transmitting a code signal representative of the preselected pseudo-random digital key, the code signal selected from the group consisting of an infrared light signal, an ultraviolet light signal, and an ultrasonic signal, wherein propagation of the code signal is confined by the predetermined boundary.

14. A method of receiving a secure, wireless communication of a message signal, the method comprising the steps of:

receiving a code signal selected from the group consisting of a light signal and an ultrasonic signal, the code signal representative of a preselected code;

receiving a radio frequency signal representative of an encoded signal; and decoding the encoded signal based upon the preselected code to recover the message signal.

15. The method of claim 14 wherein the code signal is an infrared light signal.

16. The method of claim 14 wherein the code signal is an ultraviolet light signal.

17. The method of claim 14 wherein the preselected code includes a binary sequence.

18. The method of claim 17 wherein the binary sequence includes a pseudo-random digital key.

19. The method of claim 18 wherein the step of decoding the encoded signal includes the steps of:

storing the pseudo-random digital key; and decoding the encoded signal in accordance with a code-division multiple access scheme using the pseudo-random digital key.

20. A method of receiving a secure, wireless communication of a message signal, the method comprising the steps of:

receiving a code signal representative of a preselected pseudo-random digital key, the code signal selected from the group consisting of an infrared light signal, an ultraviolet light signal, and an ultrasonic signal;

storing the pseudo-random digital key;

receiving a radio frequency signal representative of an encoded signal; and decoding the encoded signal to recover the message signal, the encoded signal demodulated in accordance with a code-division multiple access scheme using the pseudo-random digital key.

21. A system for secure wireless communication of a message signal within a predetermined boundary, the system comprising:

an encoder which encodes the message signal using a preselected code, the encoder generating an encoded signal;

a first transmitter which transmits a radio frequency signal representative of the encoded signal; and a second transmitter which transmits a code signal representative of the preselected code, wherein propagation of the code signal is confined within the predetermined boundary.

22. The system of claim 21 wherein the encoder includes a code-division multiple access encoder.

23. The system of claim 21 wherein the preselected code includes a binary sequence.

24. The system of claim 23 wherein the binary sequence is periodic based upon a pseudo-random digital key.

25. The system of claim 23 wherein the code signal is transmitted at a bit rate less than a bit rate of the encoded signal.

26. The system of claim 23 wherein the code signal is transmitted at a bit rate less than a bit rate of the message signal.

27. The system of claim 21 wherein the predetermined boundary is defined by at least one wall, a floor, and a ceiling.

28. The system of claim 21 wherein the radio frequency signal propagates beyond the predetermined boundary.

29. The system of claim 21 wherein the second transmitter includes an infrared light emitter for transmitting the code signal, whereby the code signal is an infrared light signal.

30. The system of claim 21 wherein the second transmitter includes an ultraviolet light emitter for transmitting the code signal, whereby the code signal is an ultraviolet light signal.

31. The system of claim 21 wherein the second transmitter includes an ultrasonic transducer for transmitting the code signal, whereby the code signal is an ultrasonic signal.

32. A system for secure wireless communication of a message signal within a predetermined boundary defined by at least one wall, a floor, and a ceiling, the system comprising:

a code-division multiple access encoder which encodes the message signal using a preselected pseudo-random digital key, the encoder generating an encoded signal;

a first transmitter which transmits a radio frequency signal representative of the encoded signal, the radio frequency signal propagating beyond the predetermined boundary; and a second transmitter which transmits a code signal representative of the preselected pseudo-random digital key, the code signal selected from the group consisting of an infrared light signal, an ultraviolet light signal, and an ultrasonic signal, wherein propagation of the code signal is confined within the predetermined boundary.

33. A system for receiving a secure, wireless communication of a message signal, the system comprising:

a first receiver which receives a radio frequency signal representative of an encoded signal;

a second receiver which receives a code signal representative of a preselected code, the code signal selected from the group consisting of a light signal and an ultrasonic signal; and a decoder which decodes the encoded signal based upon the preselected code, whereby the decoder recovers the message signal.

34. The system of claim 33 wherein the code signal is an infrared light signal, and wherein the second receiver includes an infrared detector for receiving the infrared light signal.

35. The system of claim 33 wherein the code signal is an ultraviolet light signal, and wherein the second receiver includes an ultraviolet detector for receiving the ultraviolet light signal.

36. The system of claim 33 wherein the code signal is an ultrasonic signal, and wherein the second receiver includes an ultrasonic transducer for receiving the ultrasonic signal.

37. The system of claim 33 wherein the preselected code includes a binary sequence.

38. The system of claim 37 wherein the binary sequence includes a pseudo-random digital key.

39. The system of claim 38 wherein the decoder includes:

a storage device for storing the pseudo-random digital key; and a code-division multiple access decoder for decoding the encoded signal using the pseudo-random digital key.

* * * * *